United States Patent

Kusters

[11] 3,894,453
[45] July 15, 1975

[54] METHOD AND APPARATUS FOR GROOVING ROLLERS

[76] Inventor: Eduard Kusters, Finkenweg 18, 415 Krefeld-Forstwald, Germany

[22] Filed: Sept. 24, 1973

[21] Appl. No.: 399,847

[30] Foreign Application Priority Data
Sept. 26, 1972   Germany............................ 2247094

[52] U.S. Cl. .............. 82/36; 29/97; 82/46; 82/101
[51] Int. Cl. ....... B23b 29/00; B23b 5/14; B26d 1/00
[58] Field of Search ......... 29/97, 97.5, 102 R; 82/5, 82/36, 46, 101

[56] References Cited
UNITED STATES PATENTS

| 301,314 | 7/1884 | Woerd ................................ 29/97 |
| 632,678 | 9/1899 | Dock ................................. 29/102 |
| 1,151,737 | 8/1915 | Thomas ........................... 29/97 X |
| 2,553,699 | 5/1951 | Brodin ......................... 29/97.5 X |
| 2,861,322 | 11/1958 | Benes et al. ......................... 29/97 |
| 3,180,006 | 4/1965 | Emmons .............................. 29/97 |
| 3,371,567 | 3/1968 | Davis ................................. 82/36 |
| 3,537,340 | 11/1970 | Westbrook ............................ 82/5 |

FOREIGN PATENTS OR APPLICATIONS

| 24,399 | 2/1907 | United Kingdom.................... 29/97 |
| 6,864 | 4/1901 | United Kingdom................. 29/102 |
| 373,737 | 3/1907 | France ............................... 29/102 |

*Primary Examiner*—Harrison L. Hinson
*Attorney, Agent, or Firm*—Kenyon & Kenyon Reilly Carr & Chapin

[57] ABSTRACT

An improved method for cutting grooves in a roller such as those used for removing excess water in the paper industry and the apparatus for carrying out that method, in which a plurality of cutting tools are supported on a rod so as to simultaneously cut a plurality of parallel circumferential grooves in the roller, thereby increasing the speed of operation and reducing the overall cost of manufacturing such rollers.

9 Claims, 5 Drawing Figures

3,894,453

METHOD AND APPARATUS FOR GROOVING ROLLERS

BACKGROUND OF THE INVENTION

This invention relates to metal rollers in general, and more particularly to an improved method for cutting closely spaced narrow slots in the circumferential surface of such metal rollers and the apparatus for carrying out that method.

The paper industry and other similar industries use rollers having a working circumference formed of a corrosion-resistant steel for removing exess water from paper products being manufactured. Typically, the rollers have slot-like circular grooves of approximately 1 millimeter width with slots being spaced a few millimeters apart. Normally the slots are also a few millimeters deep. The manufacture of such rollers having these narrow slots, particularly when manufacturing rollers greater than 10 meters in length and having a corresponding large diameter of toughened hard steel, has presented considerable difficulties. The prior art method used in manufacturing such rollers has been one in which spiral grooves have been cut into the roller. The tools used, since they are narrow, only had a minimum cutting capacity and thus only a minimum amount of pressure could be applied. Several steps of spiral cutting were required in order to get a groove of the required depth. Such operations were carried out on lathes with high pitch accuracy in the longitudinal feed. Even with such high accuracy tooling, it is impossible to avoid side wear of the tools which, if it does not result in tool breakage, can lead to overheating because of the side friction of the slot. In either case, the working speed is limited and therefore working periods of weeks and even months are not unusual in making the slots in rollers of large sizes. Of course, during this time, a very large lathe is continually employed resulting in a considerable expense for making the rollers.

Thus, it can be seen that there is a need for an improved method of cutting such slots or grooves, which method will be faster and less expensive.

SUMMARY OF THE INVENTION

In accomplishing these objectives, the present invention provides a set of cutting tools which are arranged side-by-side and engage the roller only radially, i.e., parallel circular grooves are cut rather than the spiral grooves of the prior art. Thus, there is no longitudinal feed. After cutting one set of grooves to the required depth, the set of cutting tools is displaced longitudinally and again caused to engage the roller to cut additional grooves.

Thereby, instead of making a single spiral slot extending over the full circumference of the roller, slots are made in a plane perpendicular to the direction of the roller axis. This eliminates the difficulties formerly encountered with the narrow cutting tools. That is, the forces which act to deform and overheat the tool are considerably reduced. Heating by side friction is virtually eliminated and thus, the cutting edge has only to sustain the increase in temperature resulting from cutting and will have a greater degree of rigidity. This allows a higher cutting speed and with the simultaneous engaging of several cutting tools results in a much shorter working period. In addition, the cutting strength of the individual tools is also increased. The cross section being cut in making the individual slots is minimal, allowing a considerable number of individual tools to be simultaneously engaged until the total cutting strength is reached. This cutting strength corresponds approximately to a rough splinter and can be handled by the usual supports of a turning lathe. Twenty or more cutting tools can work simultaneously.

Cutting tools can be spaced to correspond to the desired slot spacing in which case the set of tools is displaced, after completing the cutting of one set of slots, a distance equal to the width of the complete set of tools. It is also possible to space the cutting tools of a set an integral multiple of slot spacings apart, i.e., so that every other or every third slot is cut simultaneously. In this case, in the succeeding cuttings, the tools are advanced one slot spacing until the distance between slots is filled in. After this, the whole set is again displaced a distance corresponding to its width. This embodiment may be preferable since it eases the process of clamping of the cutting tools to a holder. In the illustrated embodiment, the tool used in practicing the method of the present invention has a plurality of cutting tools disposed side-by-side in a clamp and arranged to simultaneously engage the circumferential surface of a roller in a longitudinal direction thereof. A known type of circular forming tool which is formed by the protrusion of segment from a perforated disk, i.e. a disk with a hole through its center, may be used. These tools are placed over and clamped on to a bar at distances corresponding to the desired groove spacing. This will cause the cutting edges to be disposed in a plane parallel to the bar and permits operation parallel to the axis of the roller. The entire package of cutting tools and their support can easily be handled and clamped.

To prevent undesired twisting of the steel disk on the bar due to applied cutting forces, the steel disks will have on their circumference a notch which engages a support to prevent such twisting. Preferably this notch can be the notch already present from the formation of the cutting edge so that one blade will form the splinter surface of the cutting tool, while the other blade abuts the support.

The supporting bar on which the cutting tools are mounted will of course be subjected to considerable bending forces as a result of the cutting forces generated. In order to prevent bending of this bar and to avoid uneven working engagement of the individual cutting tools, provisions are made in the preferred embodiment for individual supports which engage the bar between the cutting tools and have opposite ends abutting a fixed support. This allows the cutting force to be transmitted to the fixed support with forces being transmitted from each individual cutting tool through an individual intermediate support and prevents bending of the bar and uneven depth of engagement by the cutting tools.

As shown in the preferred embodiment, the individual intermediate supports are arranged so that their major axes are in the direction of the resultant forces which occur at the cutting tool.

In a further embodiment, an hydraulic medium is placed between the fixed supports and the individual intermediate support members which are attached to the rod holding the cutting tools. This allows the cutting force to be independent of any possible twisting of the support and achieves the maximum possible evenness in cutting. In this embodiment, all cutting tools are supported against the hydraulic medium equally, so that equal forces are transferred to them through the equal transfer of pressure in the hydraulic medium. In a specific illustrated embodiment, the hydraulic support is a hydraulic pressure cushion which is provided between the fixed support and the clamp holding the individual intermediate supports. A further arrangement is illustrated in which the volume of the hydraulic medium within the pressure cushion or in a pressure chamber is controlled to control the feed of the cutting tools. This permits feeding not through the movement of the support but instead through pressure, so that the sudden occurence of a cutting force which is too great, and which would be reflected by the pressure of the hydraulic medium, is prevented.

DETAILED DESCRIPTION OF THE PREFERRED EMBODIMENT

Figure 1:
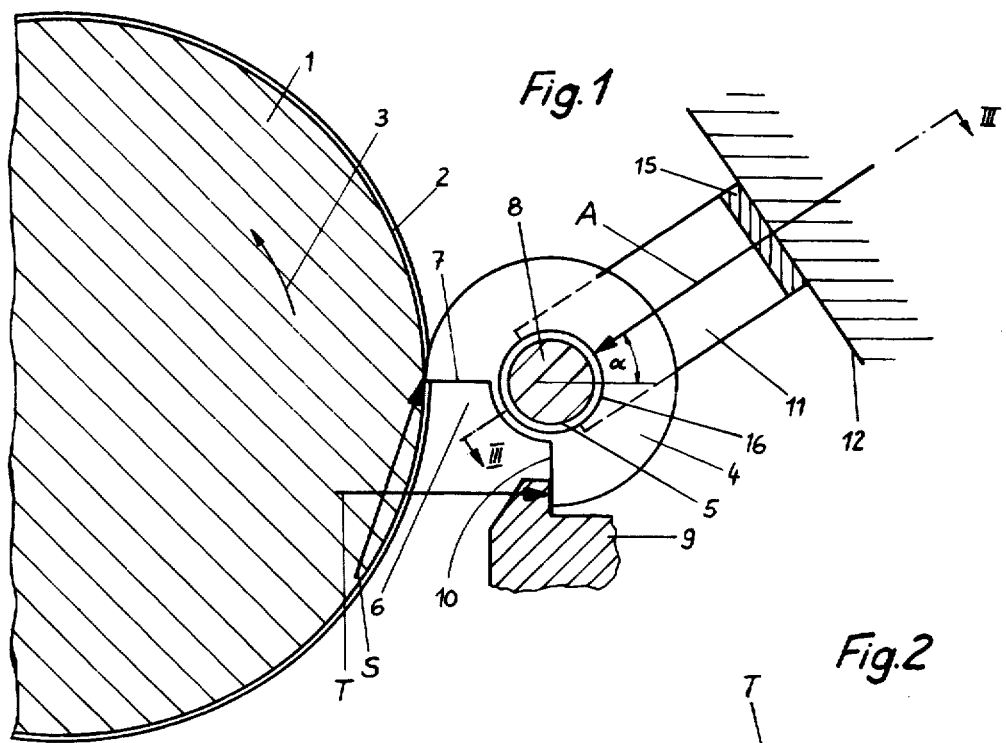
FIG. 1 is a cross-sectional view through a portion of a lathe on which is mounted a roller showing the cutting tool arrangement of the present invention.

As illustrated in FIG. 1, a roller of the type described above designated as 1 and having a working circumference of corrosion-resistant steel is mounted for rotation within a lathe (not shown in detail) in the direction of arrow 3. As described above, it is the purpose of the present invention to form grooves 2 in the circumference of the roller, so that it may be used for the removal of water in a paper manufacturing process or the like.

The slots or grooves 2 are cut by cutting tools 4, which comprise a circular steel disk which is provided with a perforation or hole 5 through its center and from which a segment 6 is cut out. As shown, the cut-out will form one quadrant of the circular disk. This results in the formation of two blades designated respectively as 7 and 10. The one blade 7 forms the cutting edge of the cutting tool 4 with the blade 7 itself being the splinter edge. In the illustrated embodiment, the splinter edge is arranged to be facing down, so that the splinters will fall down and out of the slot being cut, and will not cause any interference in the narrow slots 2, which might otherwise result, e.g. cuttings or splinters could wedge between the slot and the tool, resulting in excessive forces.

A plurality of cutting tools 4 are mounted on a bar 8, as can be seen from reference to FIG. 3 which will be described in more detail below. A support 9 is provided which abuts the edge 10 of the cut-out 6 and aids in preventing undesired twisting of the cutting tools 4 on the bar as the cutting forces are applied. A plurality of individual intermediate supports 11 are used for supporting the bar 8 and cutting tools 4. As illustrated, these rest against a fixed support 12, which along with the supporting member 9, is mounted to the frame of the lathe (not shown). In this embodiment the support 12 and member 9 together will be movable radially to and from the roller 1 to provide radial feed in conventional fashion.

Figure 2:
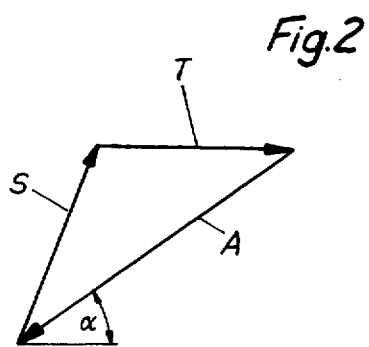
FIG. 2 is a force diagram illustrating the forces resulting in the arrangement of FIG. 1.

The forces acting on the cutting tool are illustrated on FIG. 1 and a force diagram of these forces is shown on FIG. 2. Shown is a cutting force S which acts on the cutting edge 7 of the cutting tool. A tangential force T acts against the support 9 and a supporting force A on the bar 8. Intermediate support 11 is adapted so that the force A which, as illustrated by FIG. 2, is the resultant force vector obtained from the forces S and T, is along the major axis of the member 11. That is, the axis of the member 11 makes an angle α with the horizontal. With this arrangement, the individual supports 11 have only to transfer pressure forces running in the direction of their major axes and they are not stressed in so far as bending is concerned, i.e., only compression forces are present.

Figure 3:
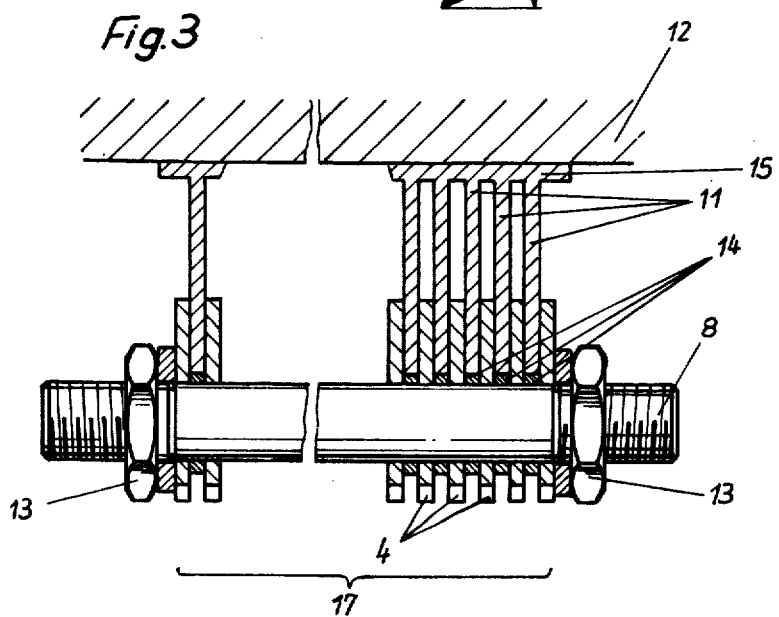
FIG. 3 is a cross-sectional plan view taken along the line III—III of FIG. 1.

The arrangement of the cutting tools 4 on the bar 8 is more clearly shown on FIG. 3. The complete set of cutting tools is designated thereon generally as 17. These cutting tools are clamped between nuts 13 at each end of the bar 8, which will have matching threads formed thereon. Between each of the cutting tools there is provided a spacer ring 14, which maintains the required distance between cutting tools. The intermediate supports 11, which are arranged in comb-like fashion side-by-side, engage the bar by engaging these spacers between the cutting tools. In the illustrated embodiment, the individual intermediate supports 11 are attached to a base plate 15 which is fastened to the fixed support 12. As can more clearly be seen from FIG. 1, the individual supports 11 have a semi-circular recess on their ends opposite base plate 15, which partially surround the bar 8 on the side opposite the cutting edge of the cutting tools. This permits the bar 8 with the set of cutting tools 4 thereon, to be easily disconnected from the supports 11 when the cutting tools 4 need to be sharpened, or if one of them has broken.

Figure 4:
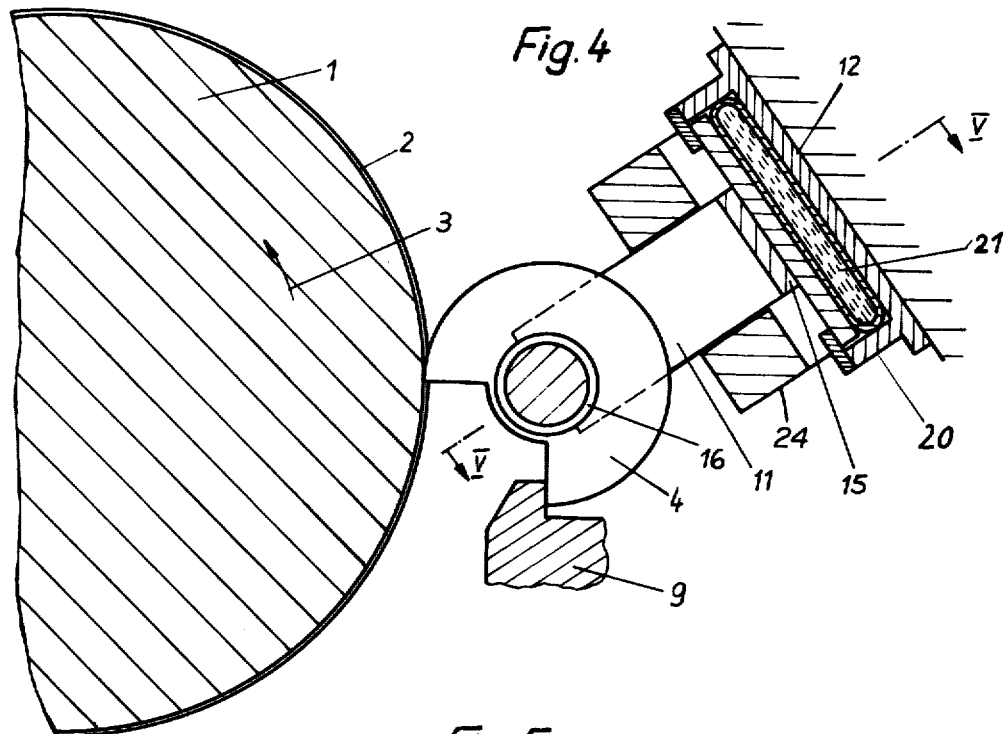
FIG. 4 illustrates an embodiment similar to FIG. 1 in which a pressure cushion is installed.
Figure 5:
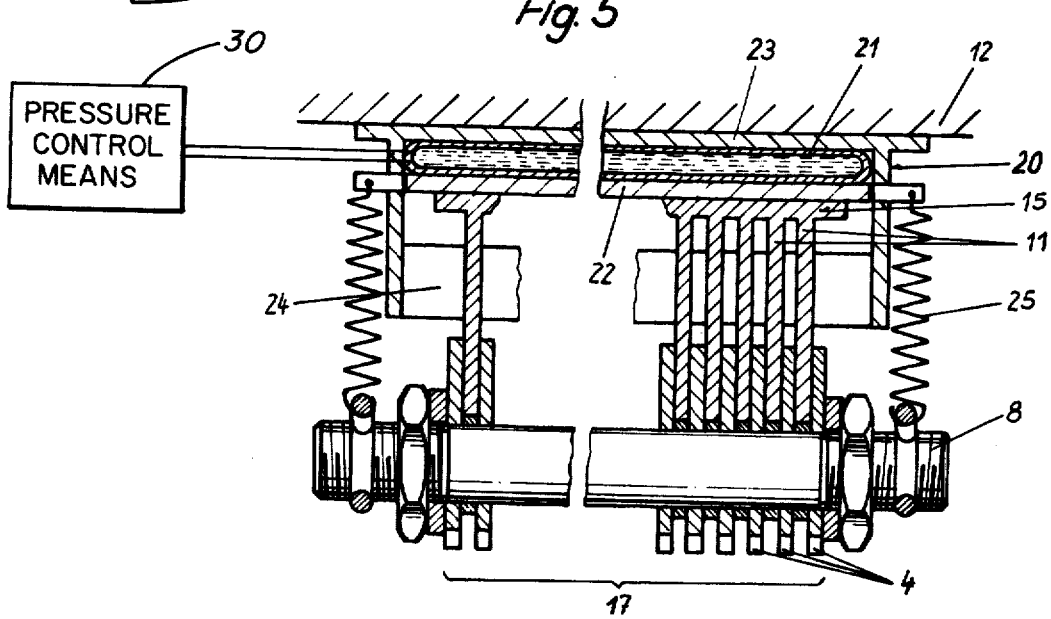
FIG. 5 illustrates a view similar to that in FIG. 3 taken along the line V—V of FIG. 4.

An improved embodiment is illustrated by FIGS. 4 and 5. The arrangement of the cutting tools 4 on the bar 8 and of the intermediate supports 11, is as described above. The primary difference in this embodiment is the interposition of an hydraulic means between the individual supports 11 and the fixed support 12. As shown, in lieu of the arrangement in FIGS. 1 and 2, where the base plate 15 is in abutment with the fixed support 12, there is now provided a box-like clamping arrangement generally designated as 20, which contains within it a pressure cushion 21 which is filled with an hydraulic medium. The base plate 15 is secured to a cover plate 22, which is restrained within the box-like member 20. In this embodiment the forces transferred by the blades of the cutting tools are then transferred to the individual intermediate supports 11 and the base plate 15, are then transmitted to the cover plate 22, then to the pressure cushion 21, which transmits the force to the plate 23 of the clamping arrangement and finally to the fixed support 12, against which the plate 23 abuts. Because of the pressure equalization obtained from the pressure cushion 21, equal pressure is obtained over its entire area independent of the deflections of the elements which receive the pressure.

In this embodiment, the individual supports 11 are guided by a guide ledge 24, which is connected to the box-like clamping member 20 in a manner such that the cutting tools and supports 11 are unrestrained in the longitudinal direction with respect to the guide ledge. Springs 25 are provided at each end of the bar 8 to hold the arrangement together even when in an unloaded condition, i.e., when the cutting tools are not engaged.

Also shown on FIG. 5 are pressure control means 30, through which the volume of hydraulic fluid in cushion 21 may be controlled. In well-known fashion, as the grooves are cut, the pressure in this medium will be reduced if the fixed support 12 is not moved so as to feed the cutting tools against the roller. Normally, feed is accomplished by moving the fixed support 12, which is attached to the lathe, until the desired depth is realized. However, in this embodiment, by controlling the pressure and adding more mdeium to the cushion 21 as the cutting progresses, the cushion 21 can further act as the feed system for the arrangement of the present invention. The pressure control means 30 typically could comprise an hydraulic medium reservoir supplying a conventional hydraulic pump and having a pressure regulating valve at its output to the cushion 21. Arrangements such as this and other similar arrangements are well-known to those skilled in the art.

The cutting tools 4 may have a spacing equal to the desired spacing of slots 2 or an integral multiple thereof. If the spacing is equal to slot spacing, the tool is radially advanced at one position until a plurality of slots of the desired depth have been cut. It is then advanced a distance equal to its width (plus one slot spacing) and cutting is repeated. This continues until the whole roller has been grooved. If tool spacing is a multiple of slot spacing, after the first cut the tools are advanced one slot spacing and a new cut made. This is done a number of times equal to the multiple of slot spacing. The tool is then moved a distance equal to its width plus one slot spacing and the process is repeated. Again this continues until the whole roller is grooved.

Thus, an improved method and apparatus for cutting circular grooves in a roller, such as used in the paper industry, has been shown. Although specific embodiments have been illustrated and described, it will be obvious to those skilled in the art that various modifications may be made without departing from the spirit of the invention which is intended to be limited solely by the appended claims.

What is claimed is:

1. In a turning lathe, improved cutting apparatus for cutting closely spaced, narrow slots in the circumferential surface of a metal roller such as rollers used in the production of paper comprising:

a. a plurality of cutting tools in the form of perforated steel discs having a cut-out portion in their circumference;
   b. a supporting bar, said plurality of cutting tools being arranged side by side thereon with equal spacing said spacing being an amount which is an integral multiple the desired slot spacing;
   c. means clamping said plurality of cutting tools together on said bar;
   d. means to support said plurality of cutting tools so as to radially engage a roller supported in said lathe, said means comprising a plurality of intermediate individual supports mounted to a common base and arranged in comblike fashion engaging said bar between said cutting tools which are equally spaced thereon, and a fixed support to which said base is secured, said fixed support being attached to the base of said lathe;
   e. means to prevent twisting of said cutting tools on said bar.

2. The invention according to claim 1 wherein said means for holding said cutting tools together comprise clamping means.

3. The invention according to claim 2 wherein said clamping means comprise threads on said bar and nuts threaded over said threads clamping said cutting tools together.

4. The invention according to claim 1 wherein said means to prevent twisting comprises a support member engaging the cut-outs in said discs.

5. The invention according to claim 1, wherein the spacing of said cutting tools is equal to the desired slot spacing.

6. The invention according to claim 1, wherein said individual supports are arranged so that their major axes are in the direction of the resultant of the forces acting on said bar.

7. The invention according to claim 1 and further including hydraulic means interposed between said common base associated with said intermediate support members and said fixed support.

8. The invention according to claim 6, wherein said hydraulic means comprise a hydraulic cushion.

9. The invention according to claim 6, and further including means to control the volume of hydraulic medium within said cushion whereby said cushion may be used to radially feed said tools.

* * * * *